(12) United States Patent
Tsubouchi

(10) Patent No.: US 7,386,979 B2
(45) Date of Patent: Jun. 17, 2008

(54) PLUNGER TYPE MASTER CYLINDER

(75) Inventor: Kaoru Tsubouchi, Toyota (JP)

(73) Assignee: Advics Co., Ltd., Kariya, Aichi (JP)

( * ) Notice: Subject to any disclaimer, the term of this patent is extended or adjusted under 35 U.S.C. 154(b) by 155 days.

(21) Appl. No.: 11/484,714

(22) Filed: Jul. 12, 2006

(65) Prior Publication Data

US 2007/0017222 A1    Jan. 25, 2007

(30) Foreign Application Priority Data

Jul. 19, 2005    (JP) .............................. 2005-208331

(51) Int. Cl.
*B60T 11/22* (2006.01)
*B60T 11/20* (2006.01)
*B60T 11/00* (2006.01)

(52) U.S. Cl. ...................................... 60/588

(58) Field of Classification Search ................. 60/585, 60/588
See application file for complete search history.

(56) References Cited

U.S. PATENT DOCUMENTS 4,964,274 A * 10/1990 Bacardit ...................... 60/588
6,438,955 B1 * 8/2002 Chiba et al. .................. 60/585
2005/0044852 A1 * 3/2005 Tsubouchi et al. ............ 60/562

FOREIGN PATENT DOCUMENTS

JP    2000-142365    5/2000

\* cited by examiner

*Primary Examiner*—Thomas E Lazo
(74) *Attorney, Agent, or Firm*—Buchanan Ingersoll & Rooney PC

(57) ABSTRACT

A master cylinder includes a piston received in a cylinder body and formed with piston ports. An annular groove is formed in the inner periphery of the piston in its area where the piston ports are formed. An arcuate plate is received in the annular groove. A sleeve is inserted into the arcuate groove to retain the arcuate plate in the annular groove. A gap as a fluid passage is defined between the arcuate plate and the inner surface of the annular groove. A pressure chamber defined in the cylinder body communicates with a communication passage communicating with a reservoir through the above gap, cutouts of holes formed in the arcuate plate and holes formed in the sleeve. When hydraulic fluid flows rapidly from the pressure chamber toward the reservoir, the arcuate plate is adapted to elastically and radially expand, thus closing some of the piston ports.

3 Claims, 6 Drawing Sheets

PLUNGER TYPE MASTER CYLINDER

BACKGROUND OF THE INVENTION

The present invention relates to a plunger type master cylinder used in a vehicle brake system, and more specifically a simple and reliable master cylinder which can smoothly draw hydraulic fluid from a reservoir during automatic brake control and which restricts backflow of hydraulic fluid from pressure chambers into the reservoir while the brakes are being manually operated.

Many of today's vehicle hydraulic brake systems are equipped with an automatic brake function such as a traction control (TRC) function or an electronic stability control (ESC) function.

In some of such brake systems, during automatic braking, hydraulic fluid is supplied from the reservoir to required units through a pressure chamber in the master cylinder. Thus in such brake systems, it is required that hydraulic fluid be smoothly drawn into the pressure chamber of the master cylinder. Also, when the brake pedal is depressed, it is necessary to restrict backflow of hydraulic fluid from the pressure chamber into the reservoir to prevent the brake pedal from being pushed in without encountering resistance.

JP patent publication 2000-142365A (paragraph [0039] and FIG. 21) discloses an arrangement that satisfies both of these requirements. This arrangement includes a throttle valve member comprising a throttle valve portion including a restricted passage and provided on the inner periphery of a piston, and a support portion fitted in the piston to support the throttle valve portion. When hydraulic fluid flows from the pressure chamber toward the reservoir, the throttle valve portion abuts a valve seat on the inner surface of the piston, thus closing the passage between the throttle valve portion and the valve seat, so that hydraulic oil flows only through the restricted passage into the reservoir.

When hydraulic fluid flows from the reservoir toward the pressure chamber, the throttle valve portion deflects and separates from the valve seat, thus opening the passage between the throttle valve portion and the valve seat. Thus, hydraulic fluid is smoothly drawn into the pressure chamber through the passage between the throttle valve and the valve seat because this passage has a larger sectional area than the restricted passage.

However, the arrangement disclosed in this publication has a problem in that the throttle valve member is complicated in structure and thus low in productivity. In order to vent air when filling the brake system with hydraulic oil, hydraulic air is fed under pressure, or with the interior of the circuit evacuated beforehand, hydraulic fluid is dawn into the circuit. When air is vented in either of the above manners, the throttle valve portion may deflect significantly into the piston and interfere with a return spring for the piston which is mounted inwardly of the throttle valve member, thus causing deformation (plastic deformation) of the throttle valve portion. This impairs various functions inherent to the throttle valve portion.

If such throttle valve portions are provided in a tandem master cylinder, which includes two pistons mounted in the cylinder and two pressure chambers defined in the cylinder, when automatic braking begins, hydraulic fluid is rapidly returned into the pressure chambers. In this state, excessive backward movement of the primary piston (rearward piston) is prevented because it is in abutment with an output rod of a booster. But the secondary piston (front piston) may excessively move backward and come out of the cups. If this happens, when the secondary piston returns to its inoperative position thereafter, the secondary piston may damage the cups or the secondary piston may be inserted into the cups in an unnatural way and skew.

An object of the present invention is to provide a simple and reliable plunger type master cylinder which can smoothly draw hydraulic fluid from a reservoir during automatic brake control and which restricts backflow of hydraulic fluid from pressure chambers into the reservoir while the brakes are being manually operated.

SUMMARY OF THE INVENTION

According to the present invention, there is provided a plunger type master cylinder comprising a cylinder body, a piston mounted in the cylinder body and having piston ports radially extending through a peripheral wall thereof, the piston defining a pressure chamber in the cylinder body, a primary cup fixed to the cylinder body and pressed against the piston, a reservoir communicating with a communication passage defined around the piston, the piston ports being positioned such that when the piston is in its inoperative position, the piston ports are not closed by the primary cup and the pressure chamber communicates with the communication passage through the piston ports, the piston having an inner periphery in which an annular groove is formed in its area where the piston ports are formed, an elastically deformable arcuate plate received in the annular groove, and a sleeve inserted in the arcuate plate and mounted to the inner periphery of the piston, thereby retaining the arcuate plate in the annular groove, the arcuate plate defining a gap as a fluid passage in cooperation with an inner surface of the annular groove while the arcuate plate is not elastically deformed, the pressure chamber communicating with the communication passage through cutouts or holes formed in the arcuate plate, holes formed in the sleeve, and the piston ports while the arcuate plate is not elastically deformed and the piston ports are not closed by the primary cup, the arcuate plate being configured to elastically and radially expand and close some of the piston ports when a pressure in the pressure chamber is higher by a predetermined value than a pressure in the communication passage.

Preferably, the sleeve includes an engaging portion engaged in an engaging groove formed in the inner periphery of the piston, thereby connecting the sleeve to the piston.

In a tandem master cylinder including a primary piston and a secondary piston, and two pressure chambers, the secondary piston preferably has auxiliary ports extending radially through the peripheral wall thereof, forwardly of the piston ports formed in the secondary piston, the auxiliary ports being positioned such that when the secondary piston is in its inoperative position, the auxiliary ports are closed by the primary cup provided around the secondary piston, and when the secondary piston moves backward from its inoperative position and the auxiliary ports clear the primary cup, the pressure chamber communicates with the communication passage through the auxiliary ports.

With the arrangement of the present invention, when hydraulic oil flows from the pressure chamber toward the reservoir, the arcuate plate received in the piston elastically and radially expands to close some of the piston ports under the pressure difference between the pressure chamber and the communication passage. Thus the return passage leading to the reservoir is restricted, thus restricting the flow (backflow) of hydraulic fluid toward the reservoir. When hydraulic fluid flows from the reservoir toward the pressure chamber, the arcuate plate separates from the surface of the annular groove formed in the inner periphery of the piston, so that all the piston ports open. Thus, hydraulic fluid can be smoothly drawn into the pressure chamber without encountering resistance because the passage therebetween is not restricted at all.

Thus, a valve mechanism is formed by the annular groove formed in the inner periphery of the piston, the arcuate plate received in the annular groove and the sleeve inserted in the arcuate plate to restrict the flow of hydraulic fluid in one direction only. Such a valve mechanism is less complicated in structure, so that its productivity is high. The arcuate plate is elastically deformed only inside the annular groove formed in the piston, so that the arcuate plate never interferes with any member of the master cylinder such as the return spring. The valve mechanism thus maintains its performance. Air can be vented reliably too.

By changing the arc angle (circumferential length) of the arcuate plate, it is possible to freely adjust the number of piston ports closed by the arcuate plate when hydraulic fluid is flowing backward. Thus it is possible to more flexibly cope with any level of requirements of the brake system.

By providing the sleeve with the engaging portion engaged in the engaging groove formed in the inner periphery of the piston, it is possible to connect the sleeve to the piston without increasing the number of parts. Also, because simply by inserting the sleeve into the arcuate sleeve, the sleeve is automatically connected the piston, the arcuate plate and the sleeve can be easily mounted to the piston.

By providing the secondary piston of the tandem master cylinder with the auxiliary ports, it is possible to prevent excessive backward movement of the secondary piston during e.g. traction control. More detailed description of the auxiliary ports is made in the following description of the preferred embodiment.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
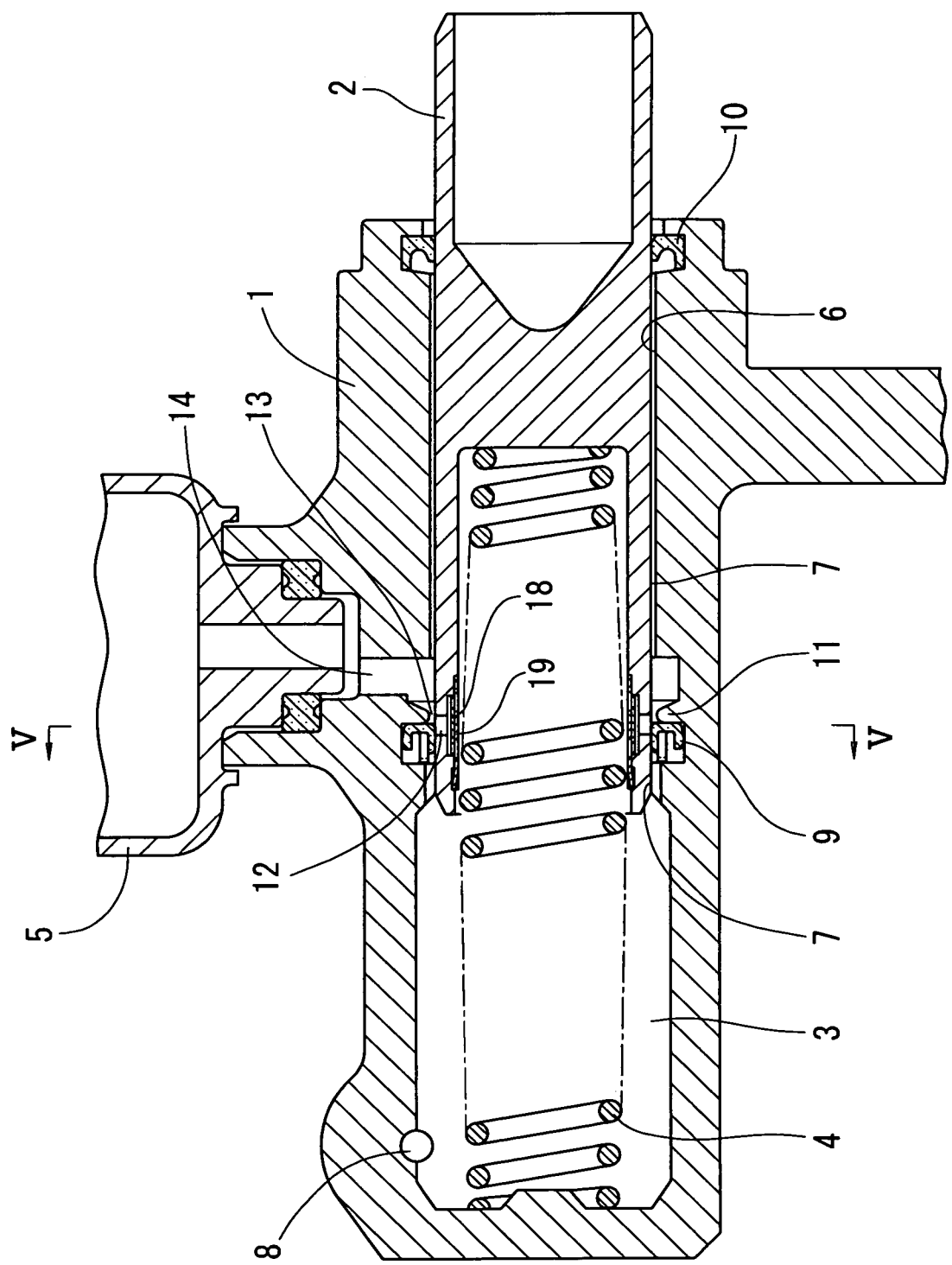
FIG. 1 is a sectional view of a master cylinder embodying the present invention.

Master cylinders embodying the present invention are now described with reference to FIGS. 1 to 8. FIG. 1 shows a basic structure of a master cylinder according to the present invention. This master cylinder comprises a cylinder body 1, a piston 2 mounted in the cylinder body 1, a return spring 4 for the piston 2, and a reservoir 5. A pressure chamber 3 is defined in the cylinder body 1 in which brake hydraulic pressure is produced by pressurizing hydraulic fluid therein with the piston 2. The pressure chamber 3 includes an output port 8 through which hydraulic pressure produced therein is discharged.

A primary cup 9 and a secondary cup 10 are received in grooves formed in the inner periphery of the cylinder body 1 and held in position by the cylinder body 1. The primary cup 9 seals the outer periphery of the piston 2. The secondary cup 10 is pressed against the outer periphery of the piston 2, thereby hermetically isolating the interior of the cylinder body 1 from the atmosphere.

In the rear (rightwardly in FIG. 1) of the primary cup 9, an annular wall 11 is integrally formed on the cylinder body 1 to support the back of the primary cup 9.

The annular wall 11 has an inner diameter larger than the outer diameter of the piston 2 to define a gap therebetween which serves as a communication passage 13. When the piston 2 is in its inoperative position (position of FIG. 1), the pressure chamber 3 communicates with the reservoir 5 through a plurality of circumferentially spaced apart piston ports 12 formed in the peripheral wall of the piston 2, the communication passage 13, and a fluid passage 14 formed in the cylinder body 1. The number of the piston ports 12 is not limited. For example, as many as about 20 such piston ports may be formed.

Figure 2:
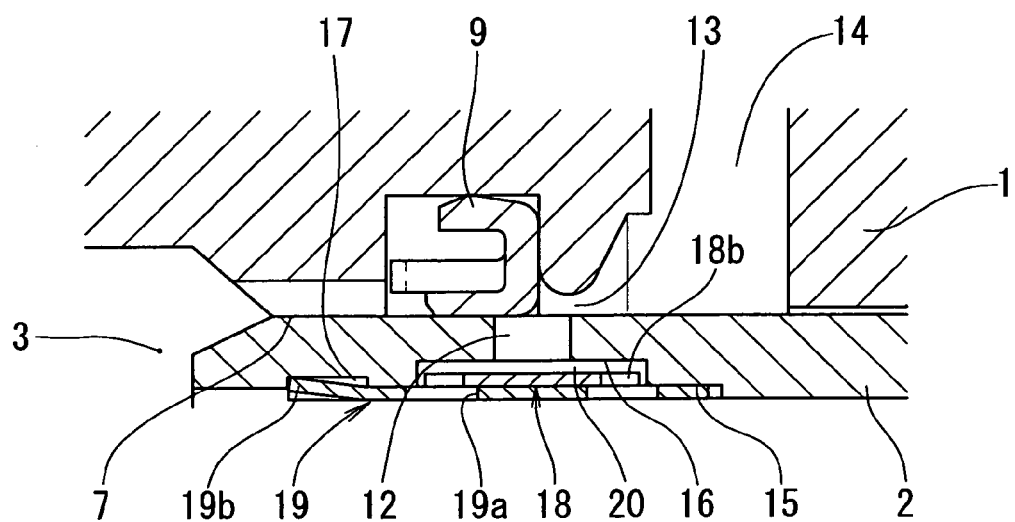
FIG. 2 is a partial enlarged sectional view of the master cylinder of FIG. 1.

FIG. 2 shows the characterizing feature of the present invention. An annular step 15 is formed in the inner periphery of the piston. In an area of the annular step 15 where the piston ports 12 are formed, an annular groove 16 is formed. Forwardly (leftwardly in FIG. 2) of the annular groove 16, an engaging groove 17 is formed in the inner periphery of the piston 2. An elastically deformable arcuate plate 18 is received in the annular groove 16. A sleeve 19 is inserted in the arcuate plate 18 and is fixed to the inner periphery of the piston 2 to retain the arcuate plate 18 in the annular groove 16.

Figures 3A, 3B:
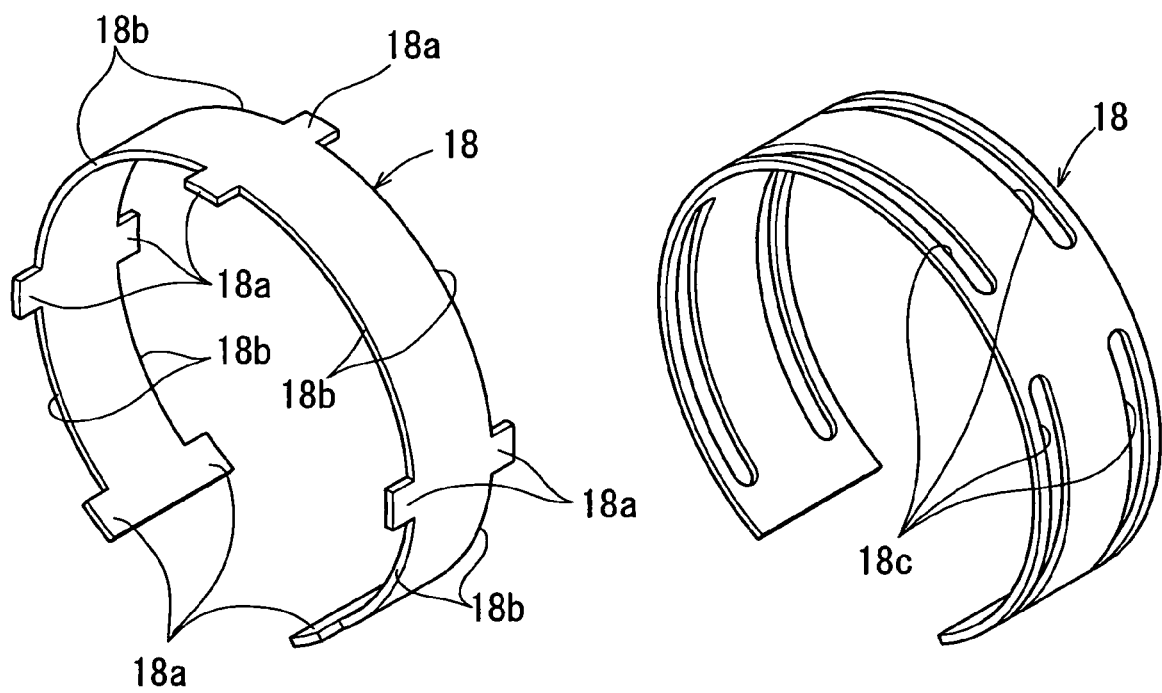
FIG. 3A is a perspective view of an arcuate plate.
FIG. 3B is a perspective view of a different arcuate plate.

The arcuate plate 18 may be either of the ones shown in FIGS. 3A and 3B. The arcuate plate 18 shown in FIG. 3A defines a plurality of circumferentially alternating protrusions 18a and cutouts 18b along both side edges, which are located axially offset from the piston ports 12. The arcuate plate 18 of FIG. 3B is formed with a plurality of circumferentially spaced apart holes 18c (such as elongated holes as shown) near each side edge thereof so as to be axially offset from the piston holes 12. The arcuate plate 18 has such an arc angle $\theta$ (see FIG. 5) as to be able to close most of the piston ports 12 except several of them (preferably 180 to 300 degrees).

Figure 4:
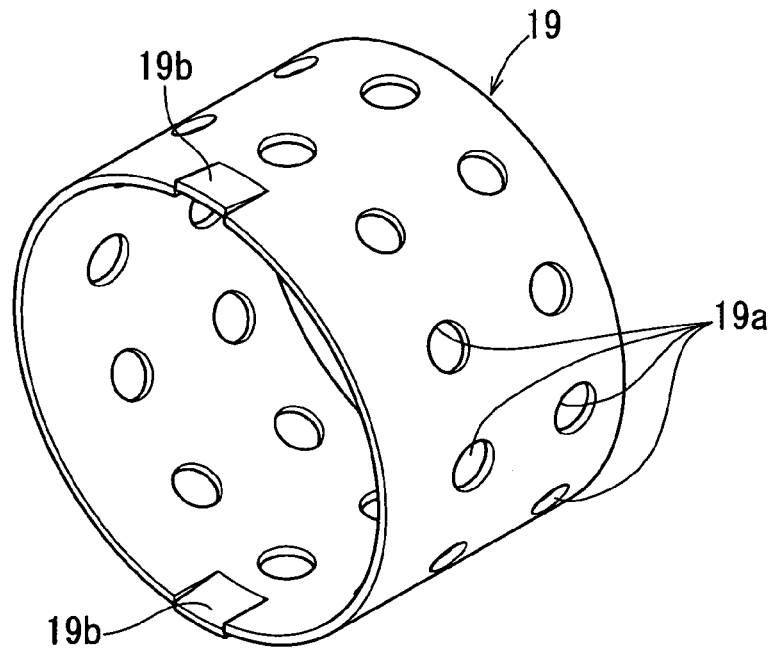
FIG. 4 is a perspective view of a sleeve.

The sleeve 19 has such an axial width as to snugly fit in the annular step 15. As shown in FIG. 4, the sleeve 19 is formed with a plurality of circumferentially spaced apart holes 19a and includes engaging portions (such as undetachably engageable claws as shown) 19b. The holes 19a are positioned so as to align with the cutouts 18b of the arcuate plate 18 of FIG. 3A or the holes 18c of the arcuate plate 18 of FIG. 3B. With the arcuate plate 18 received in the annular groove 16, the sleeve 19 is inserted into the arcuate plate 18 until its engaging portions 19b engage in the engaging groove 17. Thus, the sleeve 19 is fixed to the inner periphery of the piston 2, so that the arcuate plate 18 is retained in the annular groove 16 by the sleeve 19.

The annular groove 16 has a depth greater than the thickness of the arcuate plate 18, so that while the arcuate plate 18 is not elastically deformed, a gap 20 as a fluid passage is defined between the inner surface of the annular groove 16 and the arcuate plate 18 in the annular groove 16.

Figure 5:
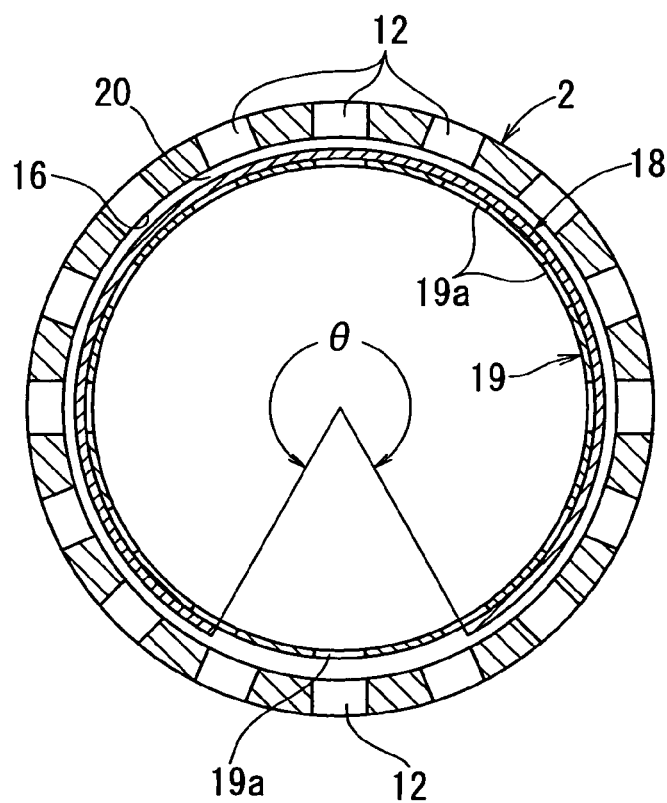
FIG. 5 is an enlarged sectional view taken along line V-V of FIG. 1.

In this arrangement, while hydraulic fluid is flowing from the reservoir 5 toward the pressure chamber 3, the arcuate plate 18 is not elastically deformed, so that the gap 20 forms between the outer periphery of the arcuate plate 18 and the inner surface of the annular groove 16 as shown in FIGS. 2 and 5. Hydraulic fluid thus smoothly flows through the communication passage 13, piston ports 12, gap 20, cutouts 18b or holes 18c of the arcuate plate 18, and the holes 19a of the sleeve 19 into the pressure chamber 3 without encountering any major resistance. Thus, during automatic braking, hydraulic fluid can be smoothly drawn from the reservoir.

Figure 6:
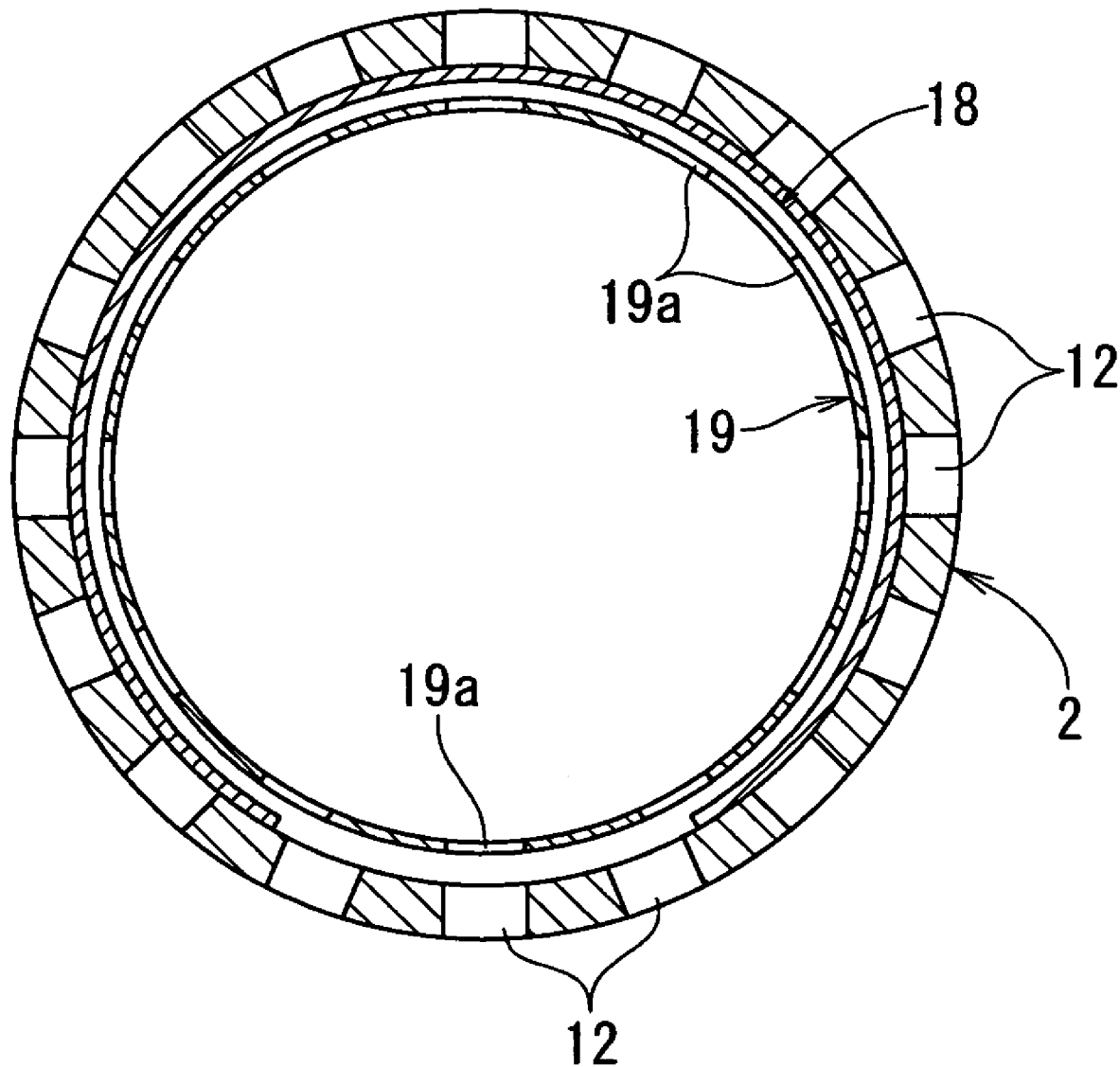
FIG. 6 is a view similar to FIG. 5 when the arcuate plate is elastically and radially expanded.

When the driver depresses the brake pedal and hydraulic fluid begins to flow from the pressure chamber 3 toward the reservoir 5, as shown in FIG. 6, the arcuate plate 18 is elastically deformed, i.e. radially expands under the pressure difference between the pressure chamber 3 and the communication passage 13 until pressed against the inner surface of the annular groove 16. In this state, the arcuate plate 18 closes most of the piston ports 12 except several of them, so that the flow of hydraulic oil is restricted because hydraulic oil can flow only through the several of the piston ports 12. That is, backflow of hydraulic fluid toward the reservoir is restricted.

Because the arcuate plate 18 is received in the annular groove 16, it does not interfere with the return spring 4. The arcuate plate 18 and the sleeve 19 may be made of a material other than a metal, such as a resin.

Figure 7:
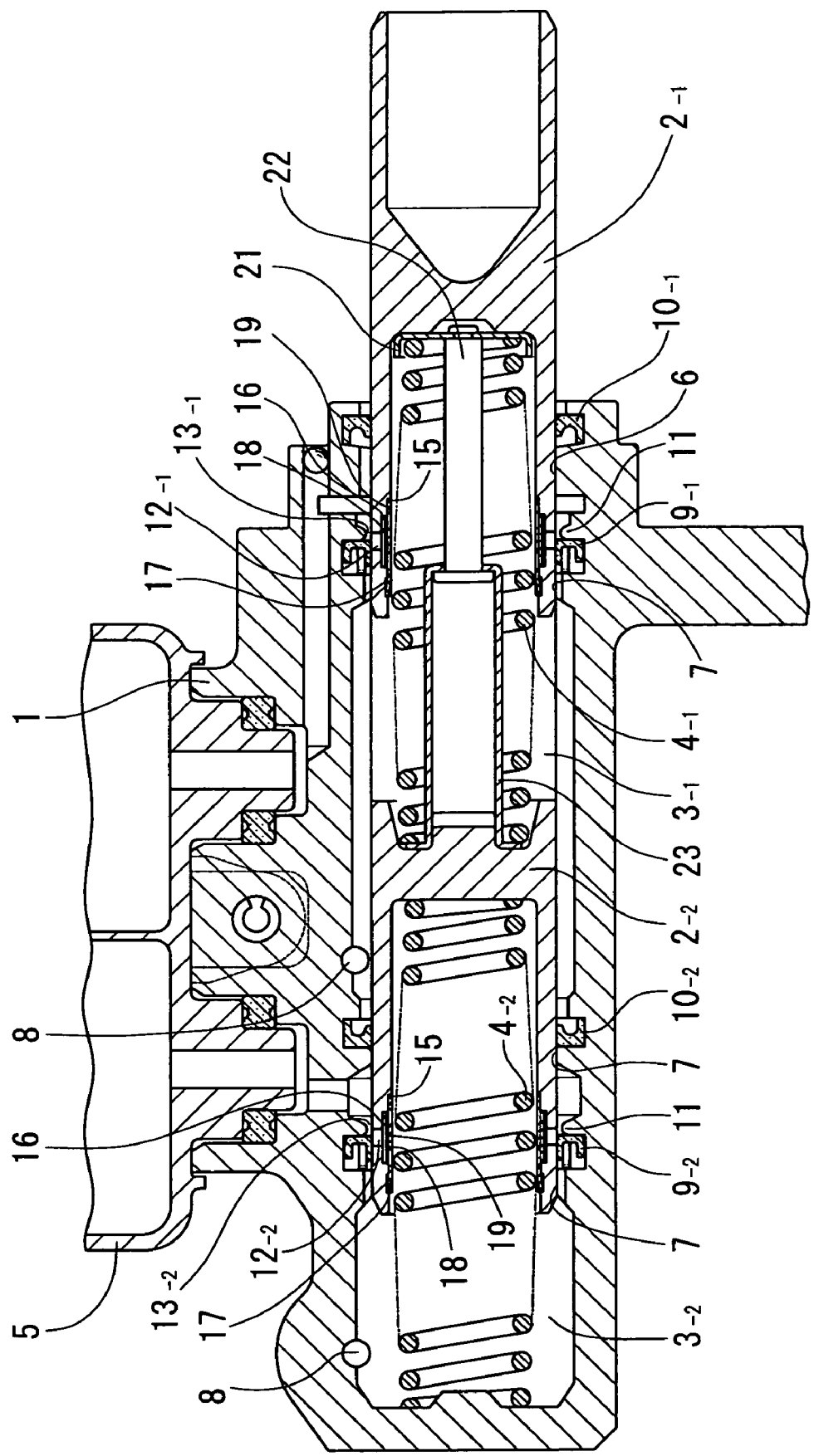
FIG. 7 is a sectional view of a tandem master cylinder to which the concept of the present invention is applied.

FIG. 7 shows a tandem master cylinder embodying the present invention. Most of today's master cylinders are tandem master cylinders. The tandem master cylinder shown includes a cylinder body 1 defining a cylinder bore 6 in which a primary piston $2_{-1}$ and a secondary piston $2_{-2}$ are mounted. A first pressure chamber $3_{-1}$ and a second pressure chamber $3_{-2}$ are defined in the cylinder bore 6. Brake hydraulic pressure is produced in the first pressure chamber $3_{-1}$ by pressuring hydraulic fluid therein with the primary piston $2_{-1}$. Brake hydraulic pressure is produced in the second pressure chamber $3_{-2}$ by pressurizing hydraulic fluid therein with the secondary piston $2_{-2}$. Return springs $4_{-1}$ and $4_{-2}$ for the primary and secondary pistons $2_{-1}$ and $2_{-2}$ are also mounted in the cylinder bore 6. Each pressure chamber has an output port 8. Around the primary piston $2_{-1}$, a primary cup $9_{-1}$ and a secondary cup $10_{-1}$ are provided. Around the secondary piston $2_{-2}$, a primary cup $9_{-2}$ and a pressure cup $10_{-2}$ are provided.

The primary piston $2_{-1}$ and the secondary piston $2_{-2}$ are formed with piston ports $12_{-1}$ and $12_{-2}$ extending through the peripheral walls of the respective pistons. On the inner periphery of each of the pistons $2_{-1}$ and $2_{-2}$, elements corresponding to those shown in FIG. 2, i.e. the annular step 15, annular groove 16, engaging groove 17, arcuate plate 18 and sleeve 19 are provided. They are not shown in detail because the corresponding elements are shown in FIG. 2. In FIG. 7, the communication passage between the first pressure chamber $3_{-1}$ and the reservoir 5 is designated by numeral $13_{-1}$ and the communication passage between the second pressure chamber $3_{-2}$ and the reservoir 5 is designated by numeral $13_{-2}$.

The return spring $4_{-1}$ for the primary piston $2_{-1}$ has one end thereof supported by a support retainer 21 and the other end supported by a suspension retainer 23 which is configured to engage a suspension pin 22 fixed to the support retainer 21 when the return spring $4_{-1}$ expands by a predetermined length, thereby preventing further expansion of the return spring $4_{-1}$. This arrangement makes it possible to use, as the return spring $4_{-1}$, a spring having a greater spring force than the return spring $4_{-2}$.

Otherwise, the master cylinder of FIG. 7 is the same as the master cylinder of FIG. 1. Thus, like element are denoted by like numerals and their description is omitted.

Figure 8:
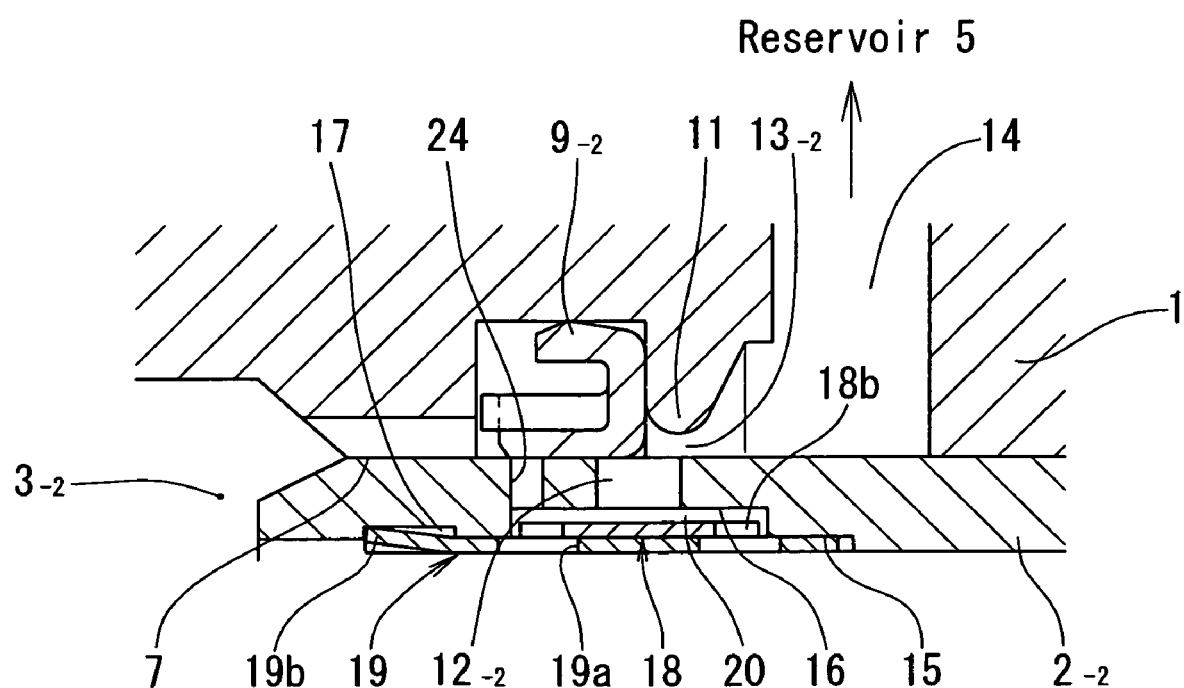
FIG. 8 is a partial enlarged sectional of a modified tandem master cylinder in which auxiliary ports are additionally formed in the secondary piston.

FIG. 8 shows another embodiment, which is a tandem master cylinder similar to the one shown in FIG. 7 but further including auxiliary ports 24 formed in the secondary piston $2_{-2}$ in front of the piston ports $12_{-2}$. The auxiliary ports 24 are closed by the primary cup $9_{-2}$ while the secondary piston $2_{-2}$ is in its inoperative position. When the secondary piston $2_{-2}$ further moves backward from the inoperative position, the auxiliary ports 24 clears the primary cup $9_{-2}$, so that the second pressure chamber $3_{-2}$ communicates with the communication passage $13_{-2}$ through the auxiliary ports 24.

When automatic brake control such as traction control starts and if hydraulic oil is rapidly returned into the pressure chambers of the master cylinder, the pressure in the pressure chambers rises, so that the pistons are pushed back under the pressure in the pressure chambers. In the case of a tandem master cylinder, the output rod of a booster (not shown) can prevent excessive backward movement of the primary piston. But since the secondary piston can move further backward from its inoperative position, it may come out of the cups. If this happens, when the secondary piston returns to its inoperative position thereafter, the secondary piston may damage the cups or the secondary piston may be inserted into the cups in an unnatural way and skew. The auxiliary ports 24 prevent this problem.

That is, as soon as the auxiliary ports 24 clear the primary cup $9_{-2}$, the second pressure chamber $3_{-2}$ communicates with the communication passage $13_{-2}$ through the auxiliary ports 24, thus releasing the pressure in the second pressure chamber $3_{-2}$ into the reservoir 5. This stops the backward movement of the secondary piston $2_{-2}$, thereby preventing the secondary piston $2_{-2}$ from coming out of the cups.

What is claimed is:

1. A plunger type master cylinder comprising:

a cylinder body;

a piston mounted in said cylinder body and having piston ports radially extending through a peripheral wall thereof, said piston defining a pressure chamber in said cylinder body;

a primary cup fixed to said cylinder body and pressed against said piston;

a reservoir communicating with a communication passage defined around said piston;

said piston ports being positioned such that when said piston is in its inoperative position, said piston ports are not closed by said primary cup and said pressure chamber communicates with said communication passage through said piston ports;

said piston having an inner periphery in which an annular groove is formed in its area where said piston ports are formed;

an elastically deformable arcuate plate received in said annular groove; and a sleeve inserted in said arcuate plate and mounted to the inner periphery of said piston, thereby retaining said arcuate plate in said annular groove;

said arcuate plate defining a gap as a fluid passage in cooperation with an inner surface of said annular groove while said arcuate plate is not elastically deformed;

said pressure chamber communicating with said communication passage through cutouts or holes formed in said arcuate plate, holes formed in said sleeve, and said piston ports while said arcuate plate is not elastically deformed and said piston ports are not closed by said primary cup;

said arcuate plate being configured to elastically and radially expand and close some of said piston ports when a pressure in said pressure chamber is higher by a predetermined value than a pressure in said communication passage.

2. The plunger type master cylinder of claim 1 wherein said sleeve includes an engaging portion engaged in an engaging groove formed in the inner periphery of said piston, thereby connecting said sleeve to said piston.

3. A tandem master cylinder comprising:

a cylinder body;

a primary piston mounted in said cylinder body and having first piston ports radially extending through a peripheral wall thereof, said primary piston defining a first pressure chamber in said cylinder body;

a secondary piston mounted in said cylinder body in front of said primary piston and having second piston ports radially extending through a peripheral wall thereof, said secondary piston defining a second pressure chamber in said cylinder body;

first and second primary cups fixed to said cylinder body and pressed against said primary and secondary pistons, respectively;

a reservoir communicating with first and second communication passages defined around said primary and secondary pistons, respectively;

said first and second piston ports being positioned such that when said primary and secondary pistons are in their respective inoperative positions, said first and second piston ports are not closed by said first and second primary cups, respectively, and said first and second pressure chambers communicate with said first and second communication passages through said first and second piston ports, respectively;

said primary and secondary pistons having in respective inner peripheral surfaces thereof first and second annular grooves in their areas where said first and second piston ports are formed, respectively;

first and second elastically deformable arcuate plates received in said first and second annular grooves, respectively; and first and second sleeves inserted in said first and second arcuate plates, respectively, and mounted to the inner peripheral surfaces of said primary and secondary pistons, respectively, thereby retaining said first and second arcuate plates in said first and second annular grooves, respectively;

said first and second arcuate plates defining first and second gaps as fluid passages in cooperation with inner surfaces of said first and second annular grooves while said first and second arcuate plates are not elastically deformed, respectively;

said first and second pressure chambers communicating with said first and second communication passages through first and second cutouts or holes formed in said first and second arcuate plates, first and second holes formed in said first and second sleeves, and said first and second piston ports while said first and second arcuate plates are not elastically deformed and said first and second piston ports are not closed by said first and second primary cups, respectively;

said first and second arcuate plates being configured to elastically and radially expand and close some of said first and second piston ports when pressures in said first and second pressure chambers are higher by predetermined values than pressures in said first and second communication passages, respectively;

said secondary piston having auxiliary ports extending radially through the peripheral wall thereof, forwardly of said second piston ports, said auxiliary ports being positioned such that when said secondary piston is in its inoperative position, said auxiliary ports are closed by said second primary cup, and when said secondary piston moves backward from its inoperative position and said auxiliary ports clear said second primary cup, said second pressure chamber communicates with said second communication passage through said auxiliary ports.

* * * * *